(12) United States Patent
Vialle

(10) Patent No.: US 10,823,257 B2
(45) Date of Patent: Nov. 3, 2020

(54) EPICYCLIC GEAR TRAIN, A MAIN GEARBOX, AN AIRCRAFT, AND A METHOD APPLIED BY SAID GEAR TRAIN

(71) Applicant: AIRBUS HELICOPTERS, Marignane (FR)

(72) Inventor: Michel Vialle, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 11 days.

(21) Appl. No.: 16/226,903

(22) Filed: Dec. 20, 2018

(65) Prior Publication Data

US 2020/0200233 A1   Jun. 25, 2020

(51) Int. Cl.
*F16H 1/28* (2006.01)
*B64C 27/12* (2006.01)

(52) U.S. Cl.
CPC .......... *F16H 1/2827* (2013.01); *B64C 27/12* (2013.01); *F16H 1/2845* (2013.01)

(58) Field of Classification Search
CPC ........ F16H 1/2827; F16H 1/2845; F16H 1/28; B64C 27/12
See application file for complete search history.

(56) References Cited

U.S. PATENT DOCUMENTS

| | | | |
|---|---|---|---|
| 3,303,713 A | 2/1967 | Hicks | |
| 3,635,103 A | 1/1972 | Monti | |
| 5,240,462 A * | 8/1993 | Mochizuki | ............ F16H 1/2863 475/341 |
| 2019/0186623 A1* | 6/2019 | Nishihira | .................. F16H 1/28 |

FOREIGN PATENT DOCUMENTS

| | | |
|---|---|---|
| DE | 814 981 C | 9/1951 |
| EP | 0003894 A1 | 9/1979 |
| EP | 2072863 A1 | 6/2009 |
| EP | 1685337 B1 | 5/2010 |
| FR | 1423589 A | 1/1966 |
| JP | H05-71591 A | 3/1993 |
| JP | 2000240735 A | 9/2000 |
| WO | WO-2018030177 A1 * | 2/2018 ........... F16H 57/082 |

OTHER PUBLICATIONS

Italian Office Action and Search Report Dated Sep. 12, 2019, Application No. 201800021133, 17 Pages.
French Search Report for Application No. 1770718, Completed by the French Patent Office, Dated Mar. 23, 2018, 8 pages.
Italian Office Action & Search Report Application No. 201800021133 Dated Sep. 12, 2019, Letter identifiers that indicate relevance of the cited documents (Including English Translation of document Description).
DE 814 981 C, Machine Translation—Description & Claims (Abstract Not Available).
JPH 05 71591 A, Abstract & Machine Translation.

* cited by examiner

*Primary Examiner* — Huan Le
(74) *Attorney, Agent, or Firm* — Brooks Kushman P.C.

(57) ABSTRACT

An epicyclic gear train comprising a sun gear, an outer ring gear, and a plurality of planet gears carried by a common planet carrier. The planet carrier comprises a support and a plurality of spindles carried by the support, each spindle having a carrier segment extending away from the support to a distal end, each planet gear being arranged around a the carrier segment. Each distal end is separated from another distal end that is adjacent thereto by a distance, and the epicyclic gear train includes a holder system for maintaining the distance within a predefined range regardless of the force applied to each spindle.

20 Claims, 3 Drawing Sheets

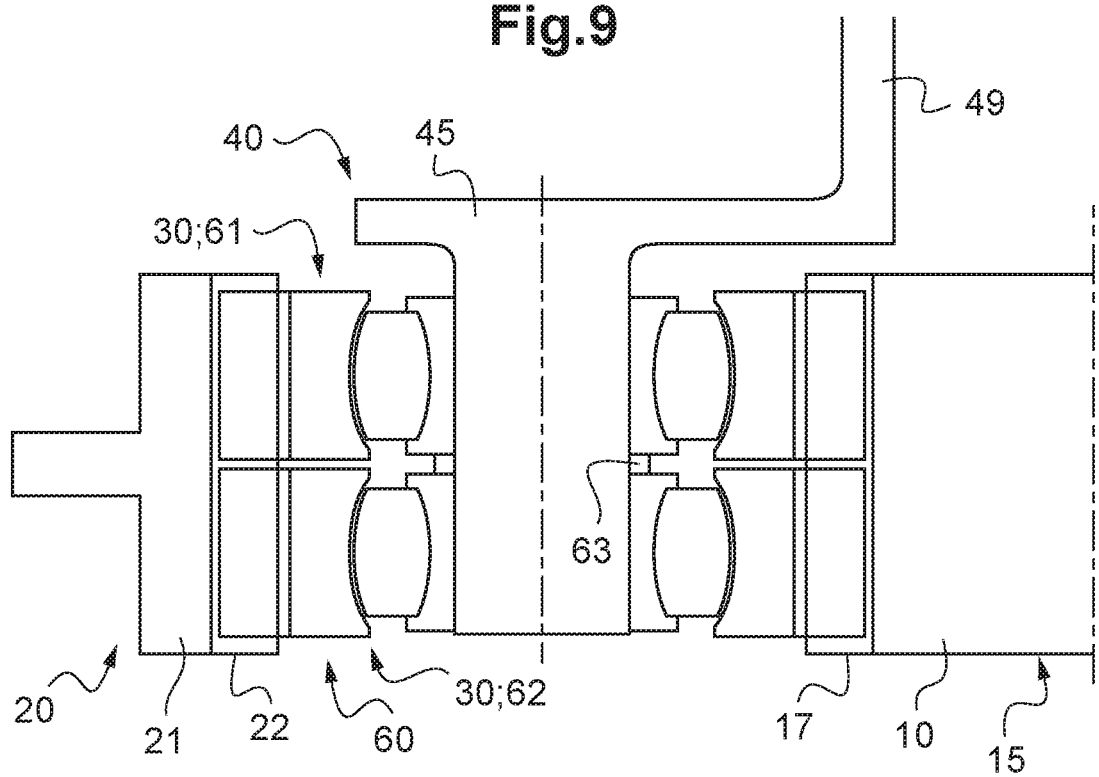
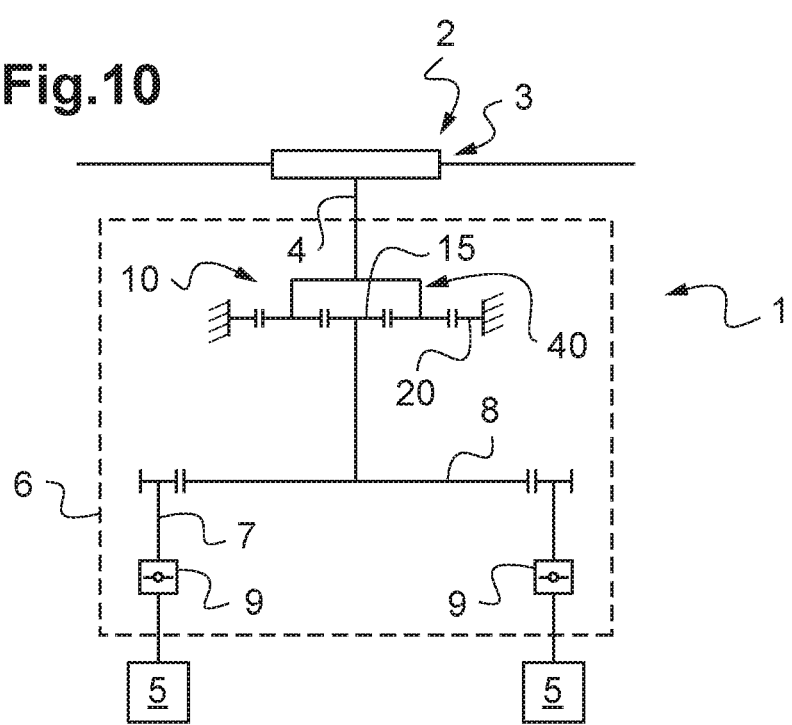

EPICYCLIC GEAR TRAIN, A MAIN GEARBOX, AN AIRCRAFT, AND A METHOD APPLIED BY SAID GEAR TRAIN

BACKGROUND OF THE INVENTION

(1) Field of the Invention

The present invention relates to an epicyclic gear train, to a main gearbox having such an epicyclic gear train, to an aircraft having such an epicyclic gear train, and to a method applied by said epicyclic gear train.

The invention thus lies in the field of gearing, and in particular to the field of main gearboxes for rotorcraft.

(2) Description of Related Art

An epicyclic gear train is a mechanical transmission device used for changing a speed of rotation between an inlet shaft and an outlet shaft.

Such an epicyclic gear train comprises a sun gear and an outer ring gear. Furthermore, the epicyclic gear train has a plurality of gearwheels forming planet gears that are carried by a planet carrier. The teeth of the planet gears mesh with the sun gear and with the outer ring. Depending on the variant, two gears selected from the sun gear, the planet carrier, and the ring gear are secured respectively to the inlet shaft and to the outlet shaft.

In this context, the planet carrier comprises a support carrying spindles. The spindles are rigidly secured to the support.

Under such circumstances, each planet gear includes a rim. The rim extends radially from an inner face to an outer face carrying teeth. The rim is arranged around a spindle. For example, a roller bearing is interposed between the inner face and the spindle. The inner face of the rim may represent an outer ring of the roller bearing, with the spindle representing an inner ring of the roller bearing.

In operation, an epicyclic gear train is liable to deteriorate. A crack can thus appear within a rim of a planet wheel and can lead to a malfunction of the epicyclic gear train.

Document FR 1 423 589 describes a flexible planet carrier having spindles for compensating machining inaccuracies. A sleeve can then be arranged between the rim of each planet gear and the corresponding spindle. The sleeve is rigidly secured to the corresponding spindle.

Document EP 1 685 337 describes a planet carrier carrying pairs of planet gears. Each pair of planet gears comprises two planet gears on a common axis arranged on opposite sides of a support of the planet carrier.

Document EP 2 072 863 describes a monolithic planet carrier of that type.

BRIEF SUMMARY OF THE INVENTION

An object of the present invention is thus to propose a novel epicyclic gear train for optimizing its lifetime.

The invention thus provides in particular an epicyclic gear train comprising a sun gear and an outer ring gear, said epicyclic gear train being provided with a plurality of planet gears that are carried by a common planet carrier, the teeth of the planet gears meshing with the sun gear and with the outer ring gear, the planet carrier including a support that extends in an axial direction from a first face to a second face, said planet carrier including a plurality of spindles carried by said support, each spindle comprising a carrier segment that extends away from said support to a distal end in one direction starting from said first face, each planet gear being arranged about a said carrier segment and presenting freedom to rotate about said carrier segment.

Each distal end is spaced apart from another distal end that is adjacent by a distance, and said epicyclic gear train includes a holder system for maintaining said distance in a predefined range regardless of the level of force applied on each spindle.

Said distance may remain constant, or it may lie within a range extending from 0.9 times a theoretical distance to 1.1 times said theoretical distance, the bounds being included in the range.

The term "teeth of the planet gears meshing with the sun gear and with the outer ring gear" means that each planet gear meshes with the sun gear and with the outer ring gear.

The term "each spindle comprising a carrier segment that extends away from said support to a distal end in one direction starting from said first face" means that the carrier segments are all situated on the same side of the support. Furthermore, a carrier segment does not extend on both sides of the support. Under such circumstances, the planet gears are all situated on the same side of the support, i.e. under or over the first face.

The term "distal end that is adjacent" serves to designate the distal end(s) closest to the distal end in question.

For example, the spindles may be arranged so that their distal ends describe a geometrical circle. The term "geometrical circle" does not specify a ring, but rather a geometrical shape circumferentially connecting together the distal ends of the spindles, each distal end specifically being beside two other distal ends that are circumferentially adjacent. The distal ends may be uniformly distributed circumferentially, with the same circular arc between any two adjacent distal ends.

Such an epicyclic gear train tends to optimize the lifetime of the epicyclic gear train.

The Applicant has identified a mode in which an epicyclic gear train can malfunction that tends to be resolved by the invention. In operation, the spindles tend to become inclined in the presence of a torque, such that each of them presents an angle relative to the central axis of rotation of the planet carrier. This angle is small but not zero. Nevertheless, the spindles remain perpendicular to the support, which means that the support becomes deformed when the spindles become inclined.

In normal operation, the angles of all of the spindles are substantially equivalent, which tends to keep the distance between the distal ends of two adjacent spindles constant. There is then no risk of interference between two planet gears arranged on two adjacent spindles.

In contrast, when the rim of a planet gear breaks as a result of wear, or spalling, or fatigue fracture, . . . , that planet gear is then less heavily loaded, mechanically. The spindle carrying the damaged planet gear takes on an inclination that is different from the others, thereby giving rise to erratic deformation of the planet carrier in the vicinity of that spindle.

In the presence of a large number of planet gears, the split planet gear can damage the adjacent gear and lead to malfunction of the epicyclic gear train.

In addition, the opening in the damaged planet gear can prevent a tooth of that planet gear from being positioned between two teeth of the sun gear. The tooth in question of the planet gear thus runs the risk of pressing against the top of a tooth of the sun gear, which tends to displace the damaged planet gear radially. The damaged planet gear then exerts a large radial force on the ring gear that might damage the ring gear.

The holder system thus tends to solve this recently identified problem in innovative manner.

The holder system may specifically tend to keep the distal ends of the spindles uniformly distributed, even in the presence of a planet gear that has opened as a result of being damaged.

The epicyclic gear train may also include one or more of the following characteristics.

In an aspect, the sun gear and the outer ring gear have a common axis.

The term "have a common axis" means that the sun gear is free to rotate about a central axis, the ring gear presenting circular symmetry about that central axis and possibly being free to rotate about the central axis.

In an aspect, said support comprises a plane main plate having said first face and a second face, the plane main plate carrying said spindles.

In a first embodiment, the holder system may include at least one piece of reinforcement arranged on said support to stiffen said support.

The reinforcement serves to stiffen the support greatly so that the support tends to remain as closely as possible in a configuration potentially corresponding to its situation when at rest.

The support then tends towards being infinitely rigid.

By means of this relatively simple solution, a distance can be maintained between two distal ends of two adjacent spindles.

Where appropriate, the reinforcement may comprise a secondary plate arranged on said main plate.

Optionally, the secondary plate is in contact with said second face.

In a second embodiment, the holder system may comprise at least one connection plate connecting together said distal ends.

The connection plate connects together the distal ends of the spindles, and as a result they are not free. The connection plate thus serves to keep a constant distance between the distal ends of the spindles.

Optionally, the connection plate comprises a ring.

In a third embodiment, each carrier segment carries a pair of two said planet gears, each pair having one planet gear arranged in elevation between said first face and another planet gear.

This third embodiment proposes arranging, not one, but rather two, planet gears on each carrier segment. The two planet gears of a pair are not situated on opposite sides of the support, but are both on the same side of the support.

Each planet gear of a pair may be of dimensions suitable for withstanding more than half of the stresses to which a conventional single planet gear would be subjected. Under such circumstances, even if one planet gear of a pair becomes split, the other planet gear tends to ensure normal operation of the epicyclic gear train. As a result, the deformation of the support does not vary substantially in the event of one planet gear breaking.

One or more of the three above embodiments may be applied to a single epicyclic gear train.

The invention also provides a main gearbox for an aircraft, the main gearbox including an epicyclic gear train of the invention.

Likewise, the invention provides an aircraft including an epicyclic gear train of the invention, possibly within a main gearbox.

The invention also provides a method of optimizing an epicyclic gear train that comprises a sun gear and an outer ring gear, said epicyclic gear train being provided with a plurality of planet gears that are carried by a common planet carrier, the teeth of the planet gears meshing with the sun gear and with the outer ring gear, the planet carrier including a support that extends in an axial direction from a first face to a second face, said planet carrier including a plurality of spindles carried by said support, each spindle comprising a carrier segment that extends away from said support to a distal end in one direction starting from said first face, each planet gear being arranged about a said carrier segment and presenting freedom to rotate about said carrier segment.

Each distal end is spaced apart from another distal end that is adjacent by a distance and said method includes a step of maintaining said distance in a predefined range regardless of the level of force applied on each spindle.

BRIEF DESCRIPTION OF THE DRAWINGS

The invention and its advantages appear in greater detail from the context of the following description of embodiments given by way of illustration and with reference to the accompanying figures, in which:

FIGS. 6 to 9 are diagrams in section showing epicyclic gear trains of the invention; and FIG. 10 is a diagram representing an aircraft and a main gearbox provided with an epicyclic gear train of the invention.

Elements present in more than one of the figures are given the same references in each of them.

DETAILED DESCRIPTION OF THE INVENTION

FIGS. 1 to 4 set out the problem, and the various deformations that are shown are exaggerated for illustrative purposes.

Figure 1:
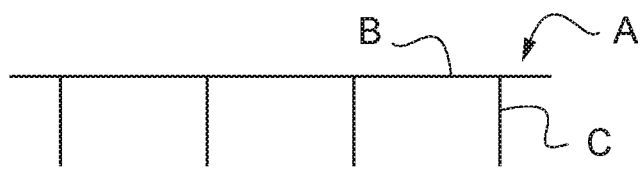
FIGS. 1 to 4 are diagrams illustrating the problem that needs to be solved.

In FIG. 1, an epicyclic gear train presents a prior art planet carrier A. The planet carrier A has a support B carrying spindles C, the spindles C carrying planet gears.

Figure 2:

With reference to FIG. 2, under the forces to which the epicyclic gear train is subjected while it is in motion, all of the spindles C can become inclined in substantially identical manner, thereby tending to deform the support B.

Figure 3:
Figure 4:

With reference to FIG. 3, if a planet gear splits, the spindle D carrying that damaged planet gear is less stressed, and as a result it becomes inclined in a manner that is different from the other spindles. The behavior of the entire epicyclic gear train is disturbed.

Figure 5:
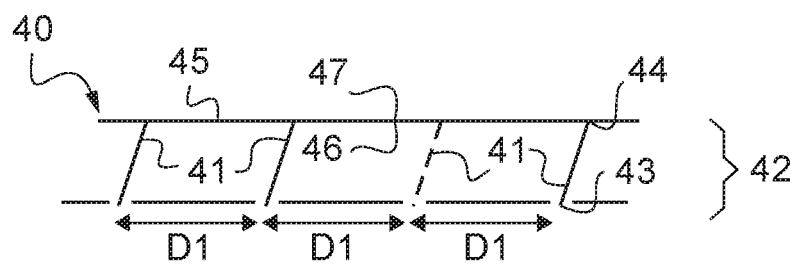
FIG. 5 is a diagram illustrating the method of the invention.

With reference to FIG. 5, and in accordance with the invention, an epicyclic gear train presents a planet carrier 40. The planet carrier 40 has a support 45. The support 45 carries spindles 41, with each spindle 41 extending from the support 45 to a distal end 43.

At rest, the distal ends are spaced apart from one another by distances. In the method of the invention, these distances are maintained within a predefined range, regardless of the level of the forces exerted on the spindles.

For example, the distance D1 between one spindle and the adjacent spindle, i.e. the nearest spindle, is substantially constant, by being maintained in said range, or indeed by being kept constant.

For example, since the distal ends of the spindles are arranged on a geometrical circle, each distal end is spaced apart from another distal end that is circumferentially adjacent by a distance that is substantially constant by being maintained in said range. The same circular arc lies between two distal ends of two adjacent spindles.

FIGS. 6 to 9 are section diagrams showing epicyclic gear trains of the invention.

Figure 6:
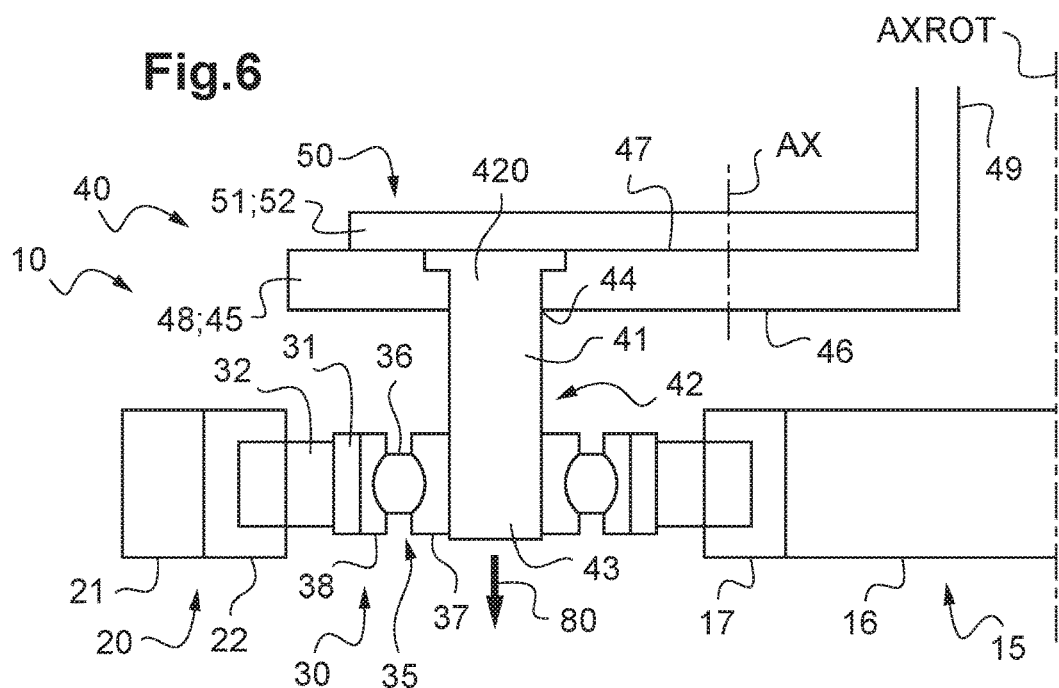

With reference to FIG. 6, and regardless of the embodiment, an epicyclic gear train 10 has a sun gear 15. The sun gear 15 thus has a rim 16 carrying teeth 17. By way of example, the teeth 17 are positioned on an edge face of the rim 16 of the sun gear 15.

Furthermore, the epicyclic gear train 10 has an outer ring gear 20. By way of example, the outer ring gear 20 comprises a ring 21 carrying teeth 22. The teeth 22 of the outer ring gear 20 face the teeth 17 of the sun gear 15.

The sun gear 15 and/or the outer ring gear 20 is/are free to rotate about an axis of rotation AXROT. The sun gear 15 and said outer ring gear 20 optionally have a common axis.

Furthermore, the epicyclic gear train 10 possesses multiple planet gears 30, each of which is arranged in the annular space present between the teeth 22 of the outer ring gear 20 and the teeth 17 of the sun gear 15. The planet gears 30 are all carried by the same planet carrier 40.

Such a planet carrier 40 presents a support 45. The support extends in an axial direction AX from a first face 46 to a second face 47. By way of example, the axial direction is parallel to the axis of rotation AXROT. The support may be secured to a connection tube 49.

In another aspect, the support 45 may present a main plate 48, e.g. of annular shape. The main plate 48 then extends in elevation in its thickness direction from the first face 46 to the second face 47.

Furthermore, the planet carrier 40 has a plurality of spindles 41 carried by the support 45. Each spindle 41 possesses a carrier segment 42. The carrier segment 42 extends in elevation away from the support 45, and where appropriate from the main plate 48, in a direction 80 from a proximal end 44 at said first face 46 to a distal end 43. For example, the distal end 43 and the proximal end 44 represent two equal segments of the carrier segment.

Each spindle 41 may be an integral portion of the support 45, with the support 45 and the spindles 41 forming a single piece. In another aspect, a spindle 41 may include a segment 420 that passes at least in part through the support 45. By way of example, each spindle 41 may then be in the form of a bolt, as shown in the variant of FIG. 6.

Regardless of the way the spindles are made, each planet gear 30 is arranged around a carrier segment 42 of a corresponding spindle so as to present a freedom to rotate about the carrier segment 42. Furthermore, each planet gear 30 meshes with the sun gear 15 and the outer ring gear 20.

Under such circumstances, each planet gear comprises a rim 31 carrying teeth 32 on its outer periphery that mesh with the teeth 17 of the sun gear 15 and the teeth 22 of the outer ring gear 20. Furthermore, a rolling bearing system 35 is interposed between an inner periphery of the rim 31 and a spindle 41. Such a bearing system 35 may include ball or roller type rolling members 36, and in particular rollers that are barrel-shaped. Barrel-shaped rollers tend to keep the teeth of the planet gears substantially parallel with the teeth of the outer ring gear 20 and of the sun gear 15.

The rolling members 36 are arranged between an outer ring 38 constrained to rotate with the teeth 32 of the planet gear 30 and an inner ring 37 secured to a spindle 41. The outer ring 38 is either a portion of the rim 31, or else it is fastened to the rim 31. Likewise, the inner ring 37 is either a portion of a spindle 41 or else is fastened to a spindle 41.

In an aspect, the epicyclic gear train 10 includes a holder system 50 for maintaining a distance D1 between two adjacent spindles within a predefined range, or for keeping that distance constant, regardless of the level of force that may be applied to each spindle 41.

In FIG. 6, the holder system 50 comprises a piece of reinforcement 51 serving to stiffen the support 45. Under such circumstances, the reinforcement 51 is arranged on said support 45.

By way of example, the reinforcement 51 comprises at least one plate that is referred to as a "secondary" plate, for convenience. The secondary plate 52 may be arranged against the support. In particular, the secondary plate 52 may be in contact with said second face 47 of the main plate 48. Optionally, the secondary plate 52 may be fastened by conventional means to the main plate 48, which means may for example be means for adhesive bonding and/or for screw fastening and/or for riveting and/or stapling, welding, . . . .

Figure 7:
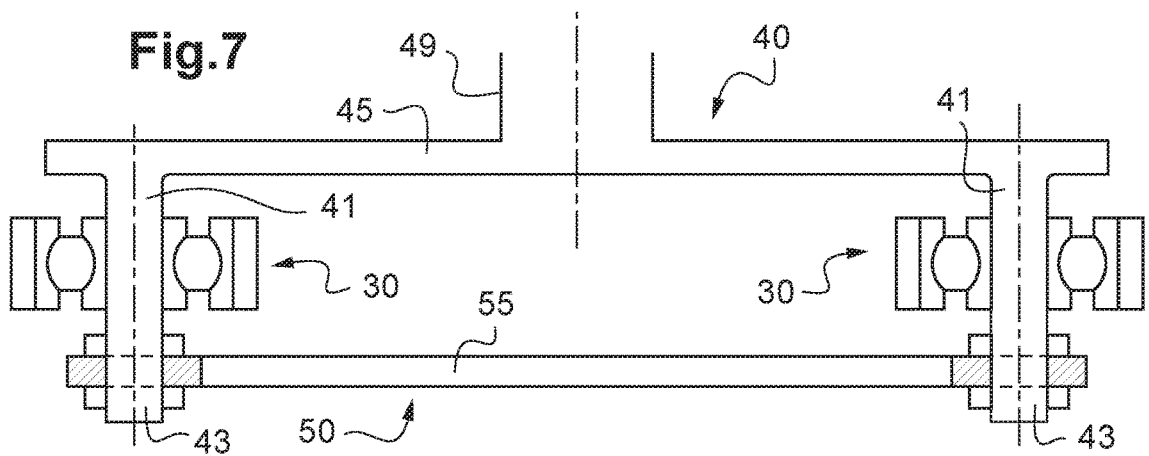

In FIG. 7, the holder system 50 may comprise a connection plate 55 connecting together the distal ends 43 of the spindles. Under such circumstances, each spindle extends from the support, passes through at least one planet gear, and then reaches the connection plate.

These distal ends 43 need not have any degree of freedom to move relative to the connection plate 55 once the connection plate 55 is installed. For example, the distal ends 43 may be securely connected to the connection plate 55.

The spindles and the connection plate may form a single integral piece. Nevertheless, in the variant shown in FIG. 7, conventional means may enable the connection plate 55 to be fastened to the spindles 41, which means they comprise, by way of example, means for adhesive bonding and/or screw fastening and/or riveting and/or stapling, welding, . . . .

Figure 8:
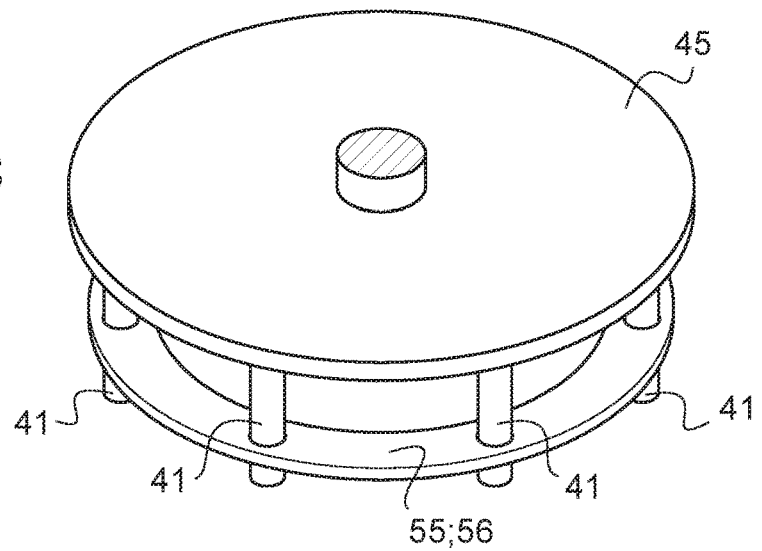

With reference to FIG. 8, the connection plate 55 may comprise a ring 56.

In FIG. 9, the holder system has a pair 60 of two said planet gears 61 and 62 arranged on each spindle 41. Each pair 60 is then made up of a first planet gear 61 and a second planet gear 62 that are offset axially, the first planet gear 61 being arranged in elevation between said first face 46 and the second planet gear 62.

A conventional spacer 63 spaces apart the two planet gears 61 and 62 of a pair 60 in elevation. By way of example, such a spacer may comprise a washer.

With reference to FIG. 10, an epicyclic gear train 10 may be arranged on an aircraft 1, and in particular on an aircraft that has a rotary wing 2. The rotary wing 2 comprises at least one rotor 3.

Optionally, the epicyclic gear train 10 may be arranged in a main gearbox (MGB).

For example, the aircraft 1 has at least one engine 5 that drives rotation of the members of an MGB 6, the MGB 6 rotating the rotary wing 2. For example, the MGB 6 has one inlet shaft 7 per engine, each inlet shaft being connected to a respective engine 5 via a conventional overrunning clutch (or "freewheel") 9. The inlet shaft 7 drives rotation of the rotary wing via various gears in the MGB 6. For example, the inlet shaft rotates a gearwheel that meshes with a combining gearwheel 8. The combining gearwheel 8 then drives an epicyclic gear train 10 of the invention that is connected to the rotary wing by a rotor mast 4.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, an MGB may be of various kinds, with FIG. 10 showing one possibility among others.

In addition, the various elements of the holder system shown in FIGS. 6 to 9 may be combined, it being possible for a holder system to include at least one piece of reinforcement and/or at least one connection plate and/or planet gears in pairs.

The invention claimed is:

1. An epicyclic gear train comprising a sole sun gear and a sole outer ring gear, the epicyclic gear train being provided with a plurality of planet gears that are carried by a common planet carrier, each of the planet gears having teeth, the teeth of the planet gears meshing with teeth of the sun gear and with teeth of the outer ring gear, the planet carrier including a support that extends in an axial direction (AX) from a first face to a second face, the planet carrier including a plurality of spindles carried by the support, each spindle comprising a carrier segment that extends away from the support to a distal end in one direction starting from the first face, each planet gear being arranged about the carrier segment and presenting freedom to rotate about the carrier segment, wherein each distal end is spaced apart from another distal end that is adjacent by a distance (D1), the epicyclic gear train including a holder system for maintaining the distance (D1) with a predefined range regardless of the level of force applied to each spindle, the holder system comprising pairs of two of the planet gears, each carrier segment carrying a pair of two of the planet gears, each pair having one planet gear arranged in elevation between the first face and another planet gear.

2. The epicyclic gear train according to claim 1, wherein the sun gear and the outer ring gear have a common axis.

3. The epicyclic gear train according to claim 1, wherein the support comprises a plane main plate having the first face and the second face, the plane main plate carrying the spindles.

4. The epicyclic gear train according to claim 1, wherein the holder system includes at least one piece of reinforcement arranged on the support to stiffen the support.

5. The epicyclic gear train according to claim 4, wherein the reinforcement comprises a secondary plate arranged on the main plate.

6. The epicyclic gear train according to claim 5, wherein the secondary plate is in contact with the second face.

7. The epicyclic gear train according to claim 1, wherein the holder system comprises at least one connection plate connecting together the distal ends.

8. The epicyclic gear train according to claim 7, wherein the connection plate comprises a ring.

9. A main gearbox for an aircraft, wherein the main gearbox includes the epicyclic gear train according to claim 1.

10. An aircraft, wherein the aircraft includes the epicyclic gear train according to claim 1.

11. An epicyclic gear train comprising only one sun gear, only one outer ring gear, and a plurality of planet gears carried by a common planet carrier, each of the planet gears having teeth, the teeth of the planet gears meshing with teeth of the sun gear and the outer ring gear, the planet carrier including a support extending in an axial direction from a first face to a second face, the planet carrier including a plurality of spindles carried by the support, each spindle comprising a carrier segment extending away from the support to a distal end in one direction starting from the first face, each planet gear rotatably arranged about the carrier segment of one of the spindles, wherein each distal end is spaced apart from another distal end that is adjacent by a distance, the epicyclic gear train having a holder system for maintaining the distance with a predefined range regardless of the level of force applied to each spindle, the holder system comprising pairs of two of the planet gears, each carrier segment carrying a pair of two of the planet gears, each pair having one planet gear arranged in elevation between the first face and another planet gear.

12. The epicyclic gear train according to claim 11, wherein the sun gear and the outer ring gear have a common axis.

13. The epicyclic gear train according to claim 11, wherein the support comprises a plane main plate having the first face and the second face, the plane main plate carrying the spindles.

14. The epicyclic gear train according to claim 11, wherein the holder system includes at least one piece of reinforcement arranged on the support to stiffen the support.

15. The epicyclic gear train according to claim 14, wherein the reinforcement comprises a secondary plate arranged on the main plate.

16. The epicyclic gear train according to claim 15, wherein the secondary plate is in contact with the second face.

17. The epicyclic gear train according to claim 11, wherein the holder system comprises at least one connection plate connecting together the distal ends.

18. The epicyclic gear train according to claim 17, wherein the connection plate comprises a ring.

19. A main gearbox for an aircraft, wherein the main gearbox includes the epicyclic gear train according to claim 11.

20. A main gearbox for an aircraft, wherein the main gearbox includes an epicyclic gear train, the epicyclic gear train comprising:
   a single sun gear, the single sun gear being the only sun gear for the epicyclic gear train;
   a single outer ring gear, the single outer ring gear being the only outer ring gear for the epicyclic gear train;
   a common planet carrier;
   a plurality of planet gears carried by the common planet carrier, each of the planet gears having teeth meshing with teeth of the sun gear and with teeth of the outer ring gear,
   the planet carrier including a support extending in an axial direction from a first face to a second face, the planet carrier including a plurality of spindles carried by the support, wherein each spindle comprises a carrier segment extending from the support to a distal end, each planet gear rotatable about the carrier segment of one of the spindles, wherein each distal end is spaced apart from another distal end that is adjacent by a distance,
   the epicyclic gear train including a holder system for maintaining the distance with a predefined range, the holder system comprising pairs of two of the planet gears, each carrier segment carrying a pair of two of the planet gears, each pair having one planet gear arranged in elevation between the first face and another planet gear.

* * * * *